US00RE45392E

(19) United States
(12) Reissued Patent
Song et al.

(10) Patent Number: US RE45,392 E
(45) Date of Reissued Patent: Feb. 24, 2015

(54) INFORMATION MANAGEMENT SYSTEM BY MEANS OF PORTABLE APPLIANCES VIA WIRE OR WIRELESS INTERNET AND THE METHOD FOR THE SAME

(76) Inventors: Seung Han Song, Seoul (KR); Seung June Song, Seoul (KR)

(21) Appl. No.: 13/445,870

(22) Filed: Apr. 12, 2012

Related U.S. Patent Documents

Reissue of:
(64) Patent No.: 7,698,313
Issued: Apr. 13, 2010
Appl. No.: 10/240,779
PCT Filed: Apr. 4, 2001
PCT No.: PCT/KR01/00570
§ 371 (c)(1),
(2), (4) Date: Oct. 4, 2002
PCT Pub. No.: WO01/80580
PCT Pub. Date: Oct. 25, 2001

(30) Foreign Application Priority Data

Apr. 4, 2000 (KR) ..... 2000-17730
Jun. 2, 2000 (KR) ..... 2000-30494

(51) Int. Cl.
*G06F 17/30* (2006.01)

(52) U.S. Cl.
USPC ..... 707/607; 707/636

(58) Field of Classification Search
USPC ..... 707/607–636
See application file for complete search history.

(56) References Cited

U.S. PATENT DOCUMENTS 5,585,789 A 12/1996 Haneda ..... 340/825.52
5,621,729 A * 4/1997 Johnson et al. ..... 370/259
5,640,565 A 6/1997 Dickinson
5,732,229 A 3/1998 Dickinson
5,748,484 A * 5/1998 Cannon et al. ..... 700/233
5,774,117 A * 6/1998 Kukkal et al. ..... 715/753
5,826,263 A 10/1998 Nakabayashi et al.
6,205,478 B1 * 3/2001 Sugano et al. ..... 709/223
6,254,001 B1 * 7/2001 Chan ..... 235/380
6,333,973 B1 * 12/2001 Smith et al. ..... 379/88.12
6,374,259 B1 * 4/2002 Celik ..... 707/104.1
6,386,451 B1 * 5/2002 Sehr ..... 235/384
6,412,689 B1 * 7/2002 Horiguchi et al. ..... 235/375
6,442,263 B1 * 8/2002 Beaton et al. ..... 379/142.04
6,533,171 B1 * 3/2003 Porter ..... 235/380
6,607,136 B1 * 8/2003 Atsmon et al. ..... 235/492
6,615,241 B1 * 9/2003 Miller et al. ..... 709/206
6,671,757 B1 * 12/2003 Multer et al. ..... 710/100
6,910,628 B1 * 6/2005 Sehr ..... 235/384
7,158,805 B1 * 1/2007 Park et al. ..... 455/519

(Continued)

FOREIGN PATENT DOCUMENTS

EP 0923040 A2 6/1999
JP 02-135958 5/1990

(Continued)

OTHER PUBLICATIONS

International Search Report for PCT/KR01/00570, dated Jun. 29, 2001.

(Continued)

*Primary Examiner* — Hanh Thai
(74) *Attorney, Agent, or Firm* — Bachman & LaPointe, P.C.

(57) ABSTRACT

The present invention is directed to an information management system. The information management system has a web server 110 and a database server 120. The database server 120 includes a business card information database 121, a relation database 122 and a user database 123. Therefore, by the present invention, a user distributes the business card information to designated receivers and the receiver transfers the business card information to the selected senders from the identified senders.

16 Claims, 10 Drawing Sheets

(56) References Cited

U.S. PATENT DOCUMENTS

| | | | | |
|---|---|---|---|---|
| 7,644,274 | B1 * | 1/2010 | Jakobsson et al. | 713/168 |
| 8,156,074 | B1 * | 4/2012 | Multer et al. | 707/610 |
| 2001/0020239 | A1 * | 9/2001 | Ukigawa et al. | 707/104.1 |

FOREIGN PATENT DOCUMENTS

| | | | |
|---|---|---|---|
| JP | 02-135958 | A | 5/1990 |
| JP | 2000-32033 | | 1/2000 |
| JP | 2000-32033 | A | 1/2000 |
| JP | 2001-282793 | | 10/2001 |
| JP | 2001-282793 | A | 10/2001 |
| KR | 10-2001-0019801 | A | 3/2001 |
| WO | 97/36233 | A1 | 10/1997 |
| WO | 00/14935 | A1 | 3/2000 |
| WO | WO 00/14935 | | 3/2000 |

OTHER PUBLICATIONS

International Preliminary Examination Report for PCT/KR01/00570, dated Jul. 19, 2002.

* cited by examiner

FIG. 5

Business card information database table (510)

| primary key (ID) | Phone No. | Name | Renewal date |
|---|---|---|---|
| 001 | 011-xxx-xxxx | Chung Hyang | 2000. 3. 1 |
| 002 | 014-xxx-xxxx | Song Seung Han | 2000. 3. 3 |
| 003 | 018-xxx-xxxx | Hong Kil Dong | 2000. 3. 4 |
| 004 | 019-xxx-xxxx | Chun U-chi | 2000. 3. 5 |
| . . . | . . . | . . . | . . . |

Relation database table (520)

| primary key | Sender ID | Receiver ID | Renewal date |
|---|---|---|---|
| A1 | 003 | 001 | 2000. 3. 3 |
| A2 | 004 | 001 | 2000. 3. 4 |
| A3 | 002 | 003 | 2000. 3. 5 |
| A4 | 005 | 003 | 2000. 3. 6 |
| . . . | . . . | . . . | . . . |

User database table (530)

ID 001 Chung Hyang

| primary key | Sender ID |
|---|---|
| B1 | 003 |
| B2 | 004 |
| . . . | . . . |

ID 003 Hong Kil Dong

| primary key | Sender ID |
|---|---|
| C1 | 002 |
| C2 | 005 |
| . . . | . . . |

INFORMATION MANAGEMENT SYSTEM BY MEANS OF PORTABLE APPLIANCES VIA WIRE OR WIRELESS INTERNET AND THE METHOD FOR THE SAME

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

This application is the national phase under 35 U.S.C. §371 of PCT International Application No. PCT/KR01/00570 which has an International filing date of Apr. 4, 2001, which designated the United States of America.

FIELD OF THE INVENTION

The present invention relates to an information management system which provides a great convenience and availability for its user. Specially, the present invention makes it possible to distribute business card information by only one input of the information and also to send information including the business card information to multiple business card providers at once.

BACKGROUND

Nowadays, the Internet technology rapidly progress and enable the wireless connection as well as the wired connection between Internet media. Accordingly, mobile communication equipments such as mobile phones, PDAs (Personal Data Assistant), Pagers have a wireless Internet browser to wirelessly connect with the Internet.

For instance, mobile phones equipped with the wireless Internet browser can access the Internet and acquire information from it.

The advance of communication technologies including the Internet enhance the convenience of their users. For instance, it is possible to transfer personal or other information via E-mail or from one mobile communication equipment to other mobile communication equipment. Now, the SMS (Short Message Service) is commercialized to send short messages between the mobile communication equipments.

Traditionally, a business card is used to give an information, That is, a personal information is recognized through the card and gives information by means of the recognized information. For instance, one uses a phone number on the received business card to call the provider of the card and send information by voice. Or one can send information by E-mail, the E-mail address being on the business card. Or one can send information by the SMS, the mobile phone number being on the business card.

To make the business card available, it should be printed and delivered to the receiver physically and the receiver should keep storage of it for later use. And, even when sending the same information to multiple business card providers, the information should be sent separately. For instance, one received business cards form three men of a, b and c, respectively and wants to send the same information to these three men via the SMS, he should input three mobile phone numbers of them, the same three information and send them, respectively.

Also, new business cards should be received again or the information on the business cards should be rewritten if the information of the provider are changed. For instance, the business card should be replaced with the newly received card or record to the change should be made on the card.

Furthermore, there is a need to make an additional record with respect to the card provider. For instance, when a business card is provided in connection with a great deal, matters related to the deal should be recorded in relation to the provided business card.

Therefore, it is desirable if one can distribute his or her personal information by use of one business card, easily keep storage of information and send information to multiple card providers at once. Further, it is desirable if renewal of information is easily made when the information of business card is changed and records to the information of business card provider is easily managed.

SUMMARY OF THE INVENTION

The present invention satisfies the above desires. The purpose of the present invention is to provide an information management system and the method for the same capable of distributing business card information by only one input of the information, easily storing the information and send information including the business card information to multiple business card providers at once.

Another purpose of the present invention is to provide an information management system and the method for the same capable of automatically renewing the business card information when the information of the business card provider is changed, informing the card receiver of the change of the information to make the receiver renew the information, and easily managing necessary records in relation to the business card provider.

According to the present invention, it is possible to distribute business card information to multiple people by only one input of the information and easily store the information.

Further, according to the present invention, a receiver of the business card information sends information to the original business card information senders at once. In connection with that, the present invention put the business card information providers together into groups and send information to a group at once. Also, the receiver of the business card information can automatically respond to the sender.

Furthermore, the present invention transfers renewed business card information when the business card information of the original sender changes. The present invention also allows facts necessary to be recorded in connection with the particular sender of the business card information to be easily recorded and managed.

Furthermore, the present invention transfers the business card information to a person who does not input his or her business card information and let the person to read the transferred business card information when he or she inputs his or her business card information.

The information management system according to the present invention comprises a web server connected to mobile communication equipments or computers via the Internet and a database server connected to the web server. The database server includes a business card information database storing business card information of each user inputted by means of the mobile communication equipments or computers, a relation database storing relation of a sender and a receiver when a user designates a specific user and orders the business card information and a user database storing a business card information sender in respect of each receiver by identifying the sender to a receiver from the relation database. Therefore, a user who inputted the business card information distributes the business card information to designated receivers from users and the receiver identifies the senders of the business card information from the user database and transfers the business card information to the selected senders from the identified senders.

According to the receiver's request, the information management system identifies the sender of the business card information, extracts the sender's business card information from the business card information database and browses the sender's business card information on the mobile communication equipment or computer of the receiver.

Also, the receiver selects a reversed receiver to whom the receiver wants to send the business card information from the browsed senders.

The database server further includes non user receiver database storing a receiver information and a record of a sender's sending of the business card information if the receiver is not one who has stored his or her business card information on the business card information database.

The information management system further includes an information transferring means to transfer information other than the business card information. For instance, the information transferring means may be a E-mail server or SMS connection means connected to means of send SMS.

An information managing method of the present invention comprises a business card information storage step where a user inputs the business card information by means of mobile communication equipments or computers via the internet and the business card information are stored; a relation establishment step where a relation of sender and receiver is stored when the user designates specific user to send the business card information; a business card sender information storage step where a business card sender information in respect of each receiver is stored, the sender to the receiver being identified from the stored relation of sender and receiver; a business card information transfer step where a sender is identified from the stored business card sender information and the business card information of the sender is extracted from the stored business card information and the extracted sender's business card information is transferred to the receiver when the receiver requests; a reversed receiver selection step where the user of the receiver identifies the senders from the transferred business card information of the sender and selects receivers from them; and a reversed information transfer step where the receiver transfers information including the business card information to the selected reversed receivers at once.

At this time, transfer step may be to browse the sender's business card information on the receiver's mobile communication equipments or computers. Also the reversed receiver selection step may be to select from the senders browsed on the receiver's mobile communication equipments or computers.

Also, the method further includes a group formation and storage step where when the sender's business card information is transferred to the receiver by the business card information transfer step, the senders are grouped and stored according to the groups and the reversed receiver selection step includes selectively designates the reversed receiver from the groups.

The business card information storage step may include step of selection automatic response so that when the business card information is sent to the receiver by the business card information transfer step, the sender automatically become the reversed receiver and the receiver's business card information is transferred to the original sender of the reversed receiver if the receiver selected automatic response.

The reversed information transfer step the information besides the business card information may be accomplished by one of information transferring means among E-mail transfer service, SMS service or messenger service.

Also the reversed information transfer step the information besides the business card information is accomplished by one of information transferring means among E-mail transfer service, SMS service or messenger service.

Further, the business card information is accomplished by sender's input of the receiver's phone number and number or code corresponding to order of sending the business card information to a mobile phone which does not essentially have the Internet browser.

The present invention provides an information management system comprising a web server connected to mobile communication equipments or computers via the Internet and a database server including a business card information database storing business card information of each user inputted by means of the mobile communication equipments or computers, whereby the web server receives information necessary to transfer the business card information from a mobile phone which does not essentially have the Internet browser and send the business card information to the designated receiver. At this case, the information management system further includes an information transferring means to transfer information other than the business card information. The information transferring means is a SMS connection means provided in the web server.

BRIEF EXPLNATION OF DRAWINGS

FIG. 5 is a view showing tables to illustrate the relation between the business card information database, the relation database and the user database.

DETAILED DESCRIPTION OF PREFERRED EMBODIMENTS

Now, the present invention will be described with reference to the accompanying drawings.

Figure 1:
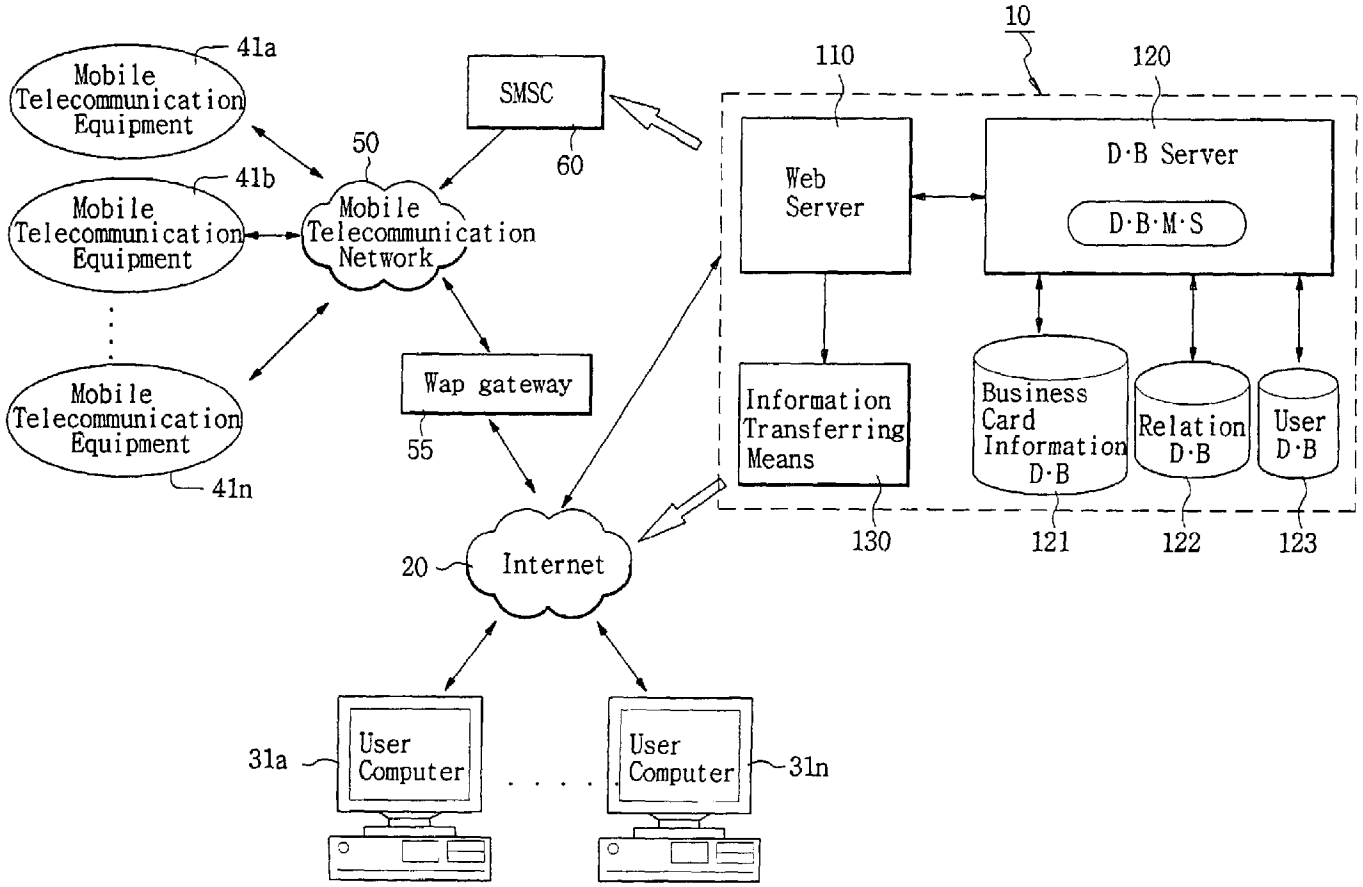
FIG. 1 is a view showing the configuration of the present invention.

FIG. 1 is a view showing the configuration of the present invention.

Firstly, the information management system 10 includes a web server 110 connected to the Internet 20. Also, the information management system includes a database server 120 for managing information of business card. Further, the information management system 10 includes an information transferring means 130 which transfers information.

The information transferring means 130 may be a mail server for E-mail such as SMTP (Simple Mail Transfer Protocol Server) server.

The information transferring means 130 may be a SMS connection means provided in the web server 110. That is, the web server 110 may connect to SMSC (SMS Center) 60 of a mobile telecommunication service company which provides SMS service to a separate mobile communication equipment by means of mobile telecommunication network and send short messages to the mobile communication equipment. In this case, the web server is directly connected to the SMSC 60 or indirectly connected to the SMSC 60 through an intermediary SMS service agent.

The information transferring means 130 may be a messenger provided in the web server 110. For instance, the commercialized MSN Messenger service is available.

The information transferring means 130 may be a web server 130 itself and directly browse information into the mobile communication equipment or computer connected to it by means of the Internet 20.

Users of the information management system 10 can access to the information management system 10 through mobile communication equipments 41a, 41b, . . . , 41n or computers 31a, . . . , 31n. When users access to the information management system 10 by means of mobile communication equipments 41a, 41b, . . . , 41n, the mobile communication equipments are connected to the Internet 20 connected to the web server 110 of the information management system 10 via the mobile telecommunication network 50 and wap gateway 55.

When users access to the information management system 10 by means of computers 31a, . . . , 31n, the computers are connected to the Internet 20 which is connected with the web server 110 of the information management system 10.

The mobile communication equipments 41a, 41b, . . . , 41n and the computers 31a, . . . , 31n have a wap browser and a browser for the wired Internet, the browsers which request information transferring to the web server 110 of the information management system 10 and browse the transferred information from the web server 110.

The database server 120 for managing information of business card in the information management system 10 include a business card information database 121, a relation database 122 and a user database 123. The business card information database 121 stores individual user's business card information inputted via the web server 110 from the mobile communication equipments 41a, 41b, . . . , 41n or the computers 31a, . . . , 31n. The relation database 122 stores relation of a sender and a receiver when one user designates a particular user and orders a send of his or her business card information to the designated user. The user database 123 stores information of business card information sender in connection with an individual user. In respect of an individual user of the receiver, a sender of business card information is recognized from the relation database 122 and the sender information is stored in the user database 123.

Therefore, users who inputted his or her business card information can designate receivers and distribute the business card information to the receivers by sending the business card information stored in the business card information database 121 to the receivers. Also, users of the receivers can identify the senders from the user database 123, selectively designate receivers from the senders and send information including his or her business card information to the designated receivers at once.

Figure 2:
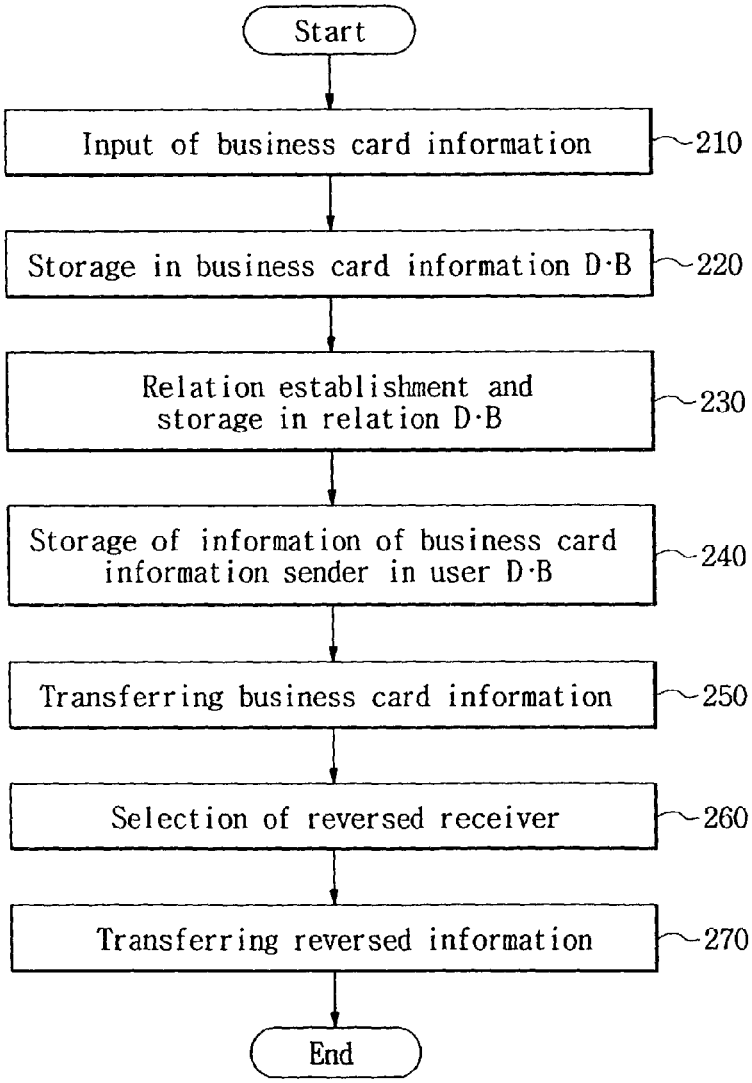
FIG. 2 is a view showing a flow chart of the present invention.

FIG. 2 shows a flow chart of the present invention.

Firstly, users access to the information management system 10 of the present invention by means of the mobile communication equipments 41a, 41b, . . . , 41n or the computers 31a, . . . , 31n and input their business card information. (Step 210) At this time, the first accessed user may acquire an ID number and a password from the information management system 10 and proceed a verification when the user accesses the information management system 10 thereafter.

The business card information are, for example, such as mobile phone number, E-mail address, company phone number, company address, position and facsimile number. Besides them, the information include useful information which should be informed of. For instance, bank account number is possible, which informs the counterpart where he or she should pay. The business card information may be a form of picture, voice or motion picture.

Then, the business card information are stored in the business card information database 121 of the information management system 10. (Step 220) Accordingly, the business card information such as mobile phone number, E-mail address, company phone number, company address, position, facsimile number and bank account number, all of which are inputted by users through the mobile communication equipments 41a, 41b, . . . , 41n or the computers 31a, . . . , 31n, are stored in the business card information database 121 of the information management system 10. At this time, it is possible to designate open to public or close to public in respect of each piece of business card information and store them. Then, only the information designated open to public are sent to receiver as described later.

As an example, on the mobile communication equipments or the computers, the items of business card information are browsed as an input window from the information management system 10 and users input each item of business card information on the browed input window. Then the mobile communication equipments or the computers transfer the information to the information management system 10 and the information management system 10 stores the transferred information on the business card information data base 121. So the steps of 210 and 220 are achieved.

After the business card information in respect of individual user are stored in the business card information database 121, when one user specifies a particular user and orders send of the business card information to the specified user, between the two users the relation of a sender and a receiver is formed, and the relation is stored in the relation database 122 (Step 230) For instance, on mobile communication equipment or computer, those of a user of a sender, the input window for item by which a receiver is uniquely specified is browsed, and user of sender can designate a particular receiver by inputting the unique item information of the receiver. The unique item information is that generally one has only one information such as mobile phone number. Also, the browsed view on the mobile communication equipment or computer may have a send button and the click of the button means the order of the sending business card information. When a particular receiver is designated and the order of sending the business card information is made by this way, the information management system 10 of the present invention recognizes the user accessed to the information management system 10 as a sender and recognizes the user whom the sender designated as a receiver, and stores the relation of the sender and the receiver between them in the relation database 122.

Then, the information management system 10 identifies the sender in respect of each receiver from the relation of the sender and the receiver stored in the relation database 122 and stores the sender information in respect of individual receiver in the user database 123. (Step 240)

Then, if there is a request from a user of the receiver of the business card information, the information management system 10 identifies the sender of the business card information to the user of the receiver from the user database 123 and extracts the sender's business card information from the business card information database 121 and transfers the sender's information to the user of the receiver. (Step 250) In this case, the business card information transfer, for example, is to browse the information on the mobile communication equipment or computer of individual user. In this case, if some of the business card information are designated whether they are open or close to public, only the information open to public are transferred.

Then, the receiver received the sender's business card information reversely selectively designates reversed receivers (Original senders) who receive the receiver's information including his or her business card information from the senders (Step 260), and send the information reversely. (Step 270). In this case, the information reversely transferred to the original sender may be the business card information of original receiver stored in the business card information database 121. This transfer of the information may be to browse the information on the mobile communication equipment or computers of the reversed receiver.

When transferring the information besides the business card information, the information transferring means 130 such as SMTP server, messenger server and SMS connection means is available.

Figure 3:
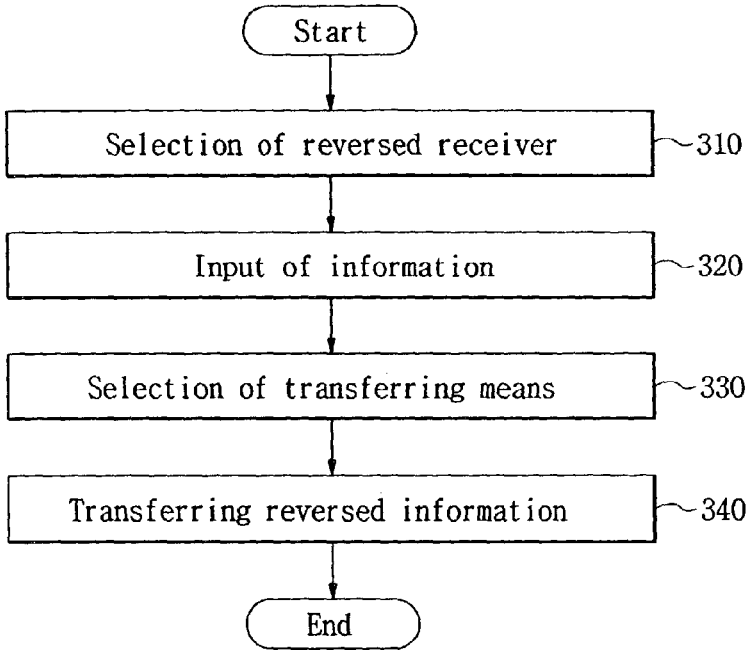
FIG. 3 is a flow chart showing the process of transferring information besides business card information to reversed receivers.

FIG. 3 is a flow chart showing the process of transferring the information besides the business card information by means of the information transferring means 130 such as SMTP server, messenger server and SMS connection means to the mobile communication equipments or the computers of the selected reversed receivers who were the original senders.

Firstly, after the business card information are transferred from the original senders, the reversed receivers are selected from them. (Step 310)

Then, information to be sent to the reversed receivers are inputted to the information transferring means 130. For instance, SMTP server is used, E-mail addresses are inputted to it.

Then, the information transferring means is selected if multiple kind of the information transferring means such as SMTP server, messenger server and SMS connection means are provided in the information management system. (Step 330)

Then, the inputted information are reversely transferred to the selected original senders. (Step 340)

Figure 4:
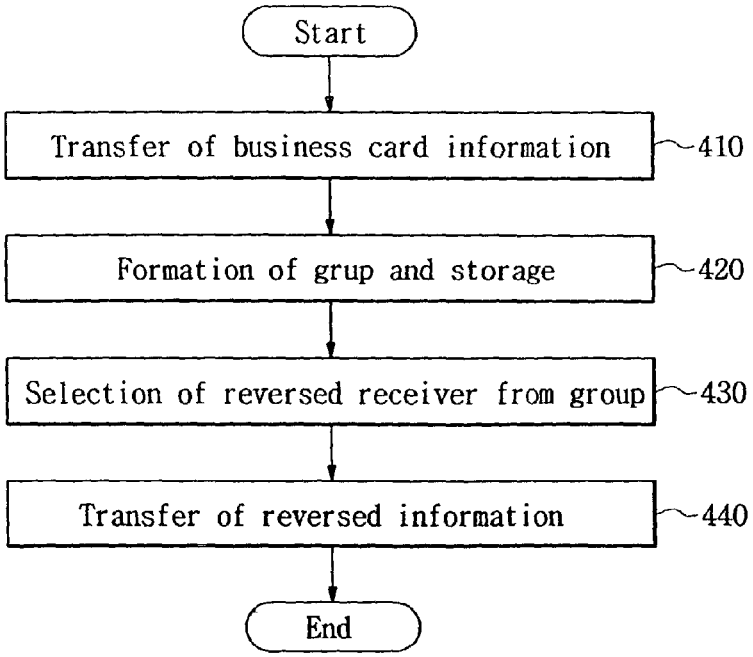
FIG. 4 is a flow chart showing the process of forming groups and reversely transferring information to a member of the group.

In selecting a reversed receivers from the original business card information senders (Step 260 of FIG. 2 or Step 310 of FIG. 3), it is possible to put together some of the original senders into groups and send the information to the groups. FIG. 4 shows such a process.

Firstly, the business card information of the sender are transferred to the user of the receiver. (Step 410)

Then, groups are formed and the senders are put to a particular group and these are stored in the group database (not shown). (Step 420) The group database stores information of business card information senders in respect of each group.

Then, user of the receiver selects reversed receivers in 65 respect of the groups who receives the business card information of other information. (Step 430)

Then, the reversed information are transferred to the selected reversed receivers of the particular groups. (Step 440)

In the above description, the input of the business card information and the selection of the receivers are accomplished by use of conventional means. Besides, there are many methods to designate the receiver. For example, Bar code or color code is available. In this case, the information of the business card or the receiver are bar coded or color coded. The mobile communication equipments 41a, 41b, . . . , 41n or computers 31a, . . . , 31n have means for reading the coded information such as bar code reader or Charge-coupled device and means for decoding the coded information and transfer the decoded information to the information management system 10.

FIG. 5 shows tables to illustrate the relation between the business card information database 121, the relation database 122 and the user database 123.

Firstly, a business card information table 510 is shown. This is the business card information which a separate user accessed to the information management system 10 inputs.

With respect to users named chun hyung, song senung han, hong kil dong, chun u-chi, their phone numbers and the renewal dates are stored corresponding to ID numbers 001, 002, 003 and 004 as primary key.

This table only shows the phone number as business card information, other information such as company name, the position, and E-mail address may be included. Also, in each field of the business card information item, whether the value is open to public or close to public may be recorded, therefore, only the field value recorded as open to public is transferred.

Referral number 520 indicates a relation database table. This table is formed when one use designates a receiver and send his or her business card information to record the relation of a sender and a receiver between them. As shown, it stores the information that ID number 003 (that is hong kil dong) sent the business card information to the ID number 001 (that is chun hyung) at Mar. 3, 2000. It stores the information that ID number 004 (that is chun u-chi) sent the business card information to the ID number 001 (that is chun hyung) at Mar. 4, 2000. It stores the information that ID number 002 (that is song seung han) sent the business card information to the ID number 003 (that is hong kil dong) at Mar. 5, 2000. Also, it stores the information that ID number 005 sent the business card information to the ID number 003 (that is hong kil dong) at Mar. 6, 2000.

The renewal date fields in the business card information table 510 and the relation database table 520 represent the date when the business card information is inputted and the date when the relation is established, respectively. They are necessary to renew and send the changed business card information to the receiver when the business card information are changed. It will be described later.

Referring to the relation table 520, the sender information in respect of each receiver are recorded and stored in the user database 123. A user table 530 is shown.

The table stores the information that the ID numbers of 003 and 004 sent the business card information in respect of the user of ID number 001 (that is chung hyung). Also, it stores the information that the ID numbers of 002 and 005 sent the business card information in respect of the user of ID number 003 (that is hong kil dong).

Accordingly, the information management system 10 of the present invention identifies the senders (that is ID number) to the ID number 001, chung hyung and extracts the business card information of the sender (the field value of record corresponding to the ID number) and transfers these information to ID number 001, chung hyung The present invention allows facts necessary to be recorded in connection with a sender of the business card information to be easily recorded and managed. Specifically, according to the present invention, the facts to be recorded in connection with the sender are inputted to the information management system 10 by users of the receivers through the mobile communication equipments or computers and stored in the user database 123. Accordingly, a user who received the business card information from a sender can record and store necessary facts in connection with the sender and identify them if necessary. To achieve this, the user database table 530 includes a field in respect of each record of the sender information and the field holds the fact that the user of the receiver inputs in connection with the sender. For instance, that field value is such as memorial date between the sender and the receiver or necessary memorandum.

Figure 9:
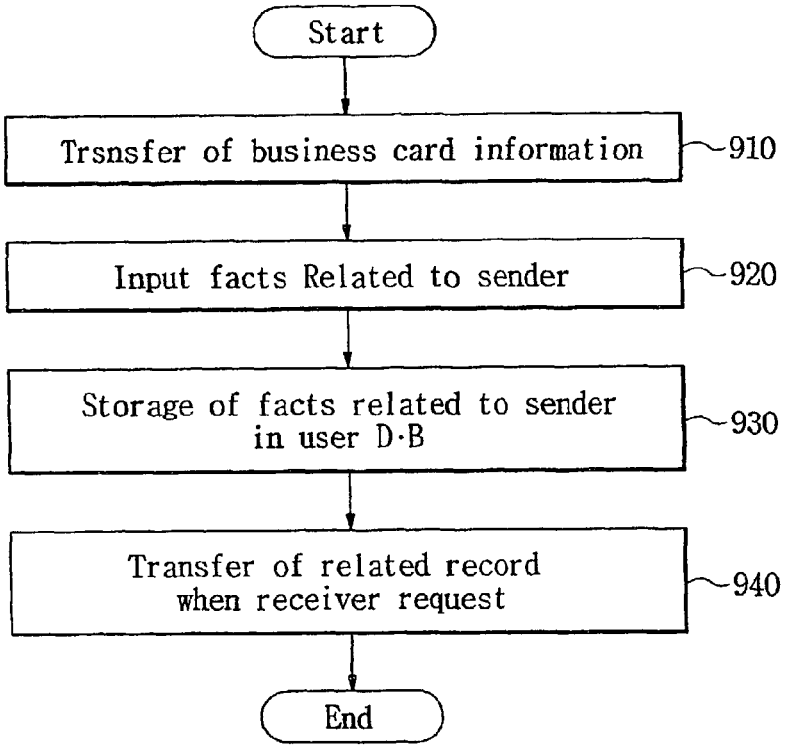
FIG. 9 is a view showing procedure of processing records in connection with a business card information provider.

FIG. 9 shows a flow chart processing the records in connection with a sender.

Firstly, a business card information is transferred to a user of a receiver. This transfer of the business card information was described with reference to steps from 210 to 250 in FIG. 2. (Step 910)

Then, the user of the receiver inputs facts in connection with the sender, the facts being formed as field values on the user database 123. (Step 920) For instance, when the business card information of the sender are transferred to the receiver by browsing the information on the mobile communication equipment or the computer of the receiver, the browsed view may include input windows for facts to be recorded in connection with the sender. Then, the receiver inputs the necessary information on the input windows and transfers the information to the information management system of the present invention 10.

The input of facts in connection with the sender is stored in the user database 123 (Step 930) For instance, in the user database table 530 in FIG. 5, these information are stored as field value with respect to each record.

Then, when the receiver requests, these inputted and stored facts in connection with the sender are transferred to the receiver. (Step 940) For instance, these may be browsed together with the business card information of the sender.

Figure 10:
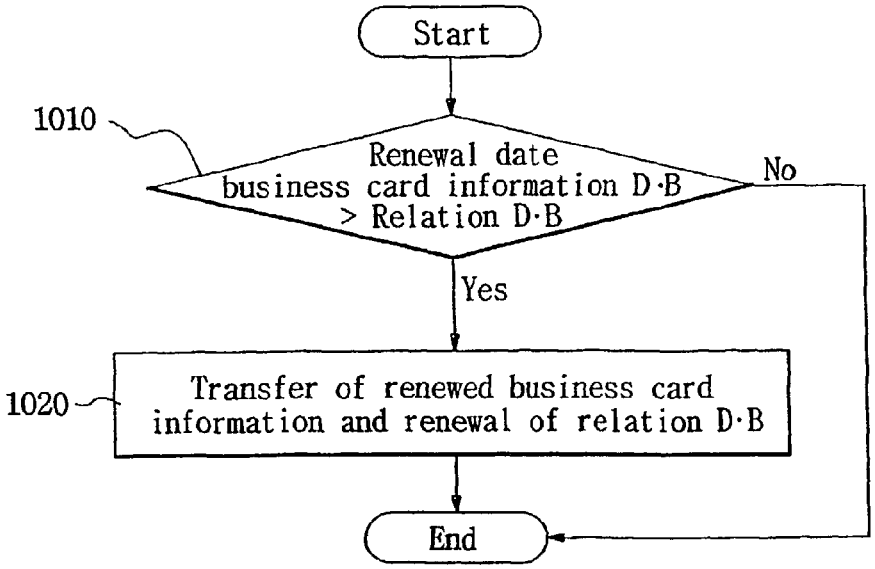
FIG. 10 is a view showing procedure of transferring the changed business card information when business card information of a sender changes.
Figure 11:
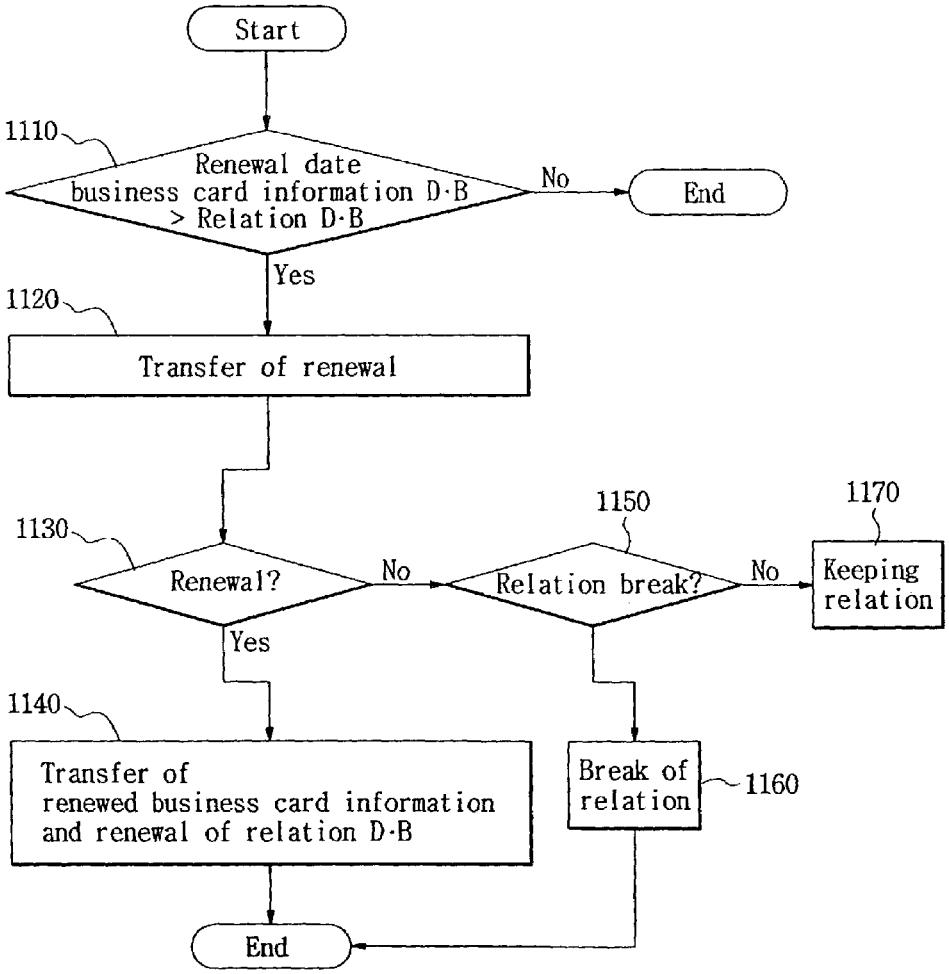
FIG. 11 is a view showing procedure of breaking relation when receiver does not want to keep the relation with a sender.

The information management system 10 of the present invention, when there is a change of a business card information of a sender, informs the individual receiver of the change to renew the senders business card information or automatically renews the sender's business card information for each of the receiver. Further, the information management system 10 of the present invention allows break of the relation when the receiver wants to break the relation between the sender and the receiver. FIGS. 10 and 11 show such a procedures.

Firstly, with reference to FIG. 10, the procedure of the changed business card information being transferred is explained when the business card information is changed.

The information management system 10 compare the storing date of the business card information recorded on the business card information database 121 (that is the renewal date of the business card information database 510 in FIG. 5) with the relation establishment date on the relation database 122 (that is the renewal date of the relation database 520 in FIG. 5) to determine which date is later. (Step 1010) If the renewal date on the business card information database 121 is later, this indicates that the sender has changed the business card information.

Accordingly, in this case, the information management system references the receiver information on the relation database 122 and transfers the changed sender's business card information to the receivers. At this time, new relation establishment date is recorded. (Step 1020)

If the renewal date on the business card information database is earlier than the relation establishment date on the relation database, that means no change of the business card information to the sender and, thus, nothing transfers.

According to the present invention, when the business card information of the sender changes, the receiver can break the relation not to receive more business card information from the sender. It is described with reference to FIG. 11.

Firstly, The information management system 10 compare the storing date of the business card information recorded on the business card information database 121 (that is the renewal date of the business card information database 510 in FIG. 5) with the relation establishment date on the relation database 122 (that is the renewal date of the relation database 520 in FIG. 5) to determine which date is later. (Step 1110) If the renewal date on the business card information database 121 is later, this indicates that the sender has changed the business card information.

Then, the information management system 10 ask the receiver whether the receiver wants to receive the changed business card information (Step 1120) For instance, the information management system 10 browses the message to the receiver's computer.

If the user of the receiver selects the renewal, the changed business card information is transferred to the user of the receiver and the relation establishment date on the relation database is renewed. (Step 1140)

If the user of the receiver do not want to renew, the information management system ask whether the user wants the break of the relation. (Step 1150)

When the user selects the break of the relation, the relation 35 between the sender the business information of whom was changed and the receiver is broken. (Step 1160) That is, the relation database 122 records the break of the relation. For instance, the user database table 520 includes field value regarding the relation break where the break is recorded as an attribute. Then, the relation is broke on the relation database 122 and if the senders business card information changes no more ask whether to renew occurs.

If the receiver does not want to break the relation, the relation database is kept and the relation is kept. (Step 1170)

Figure 6:
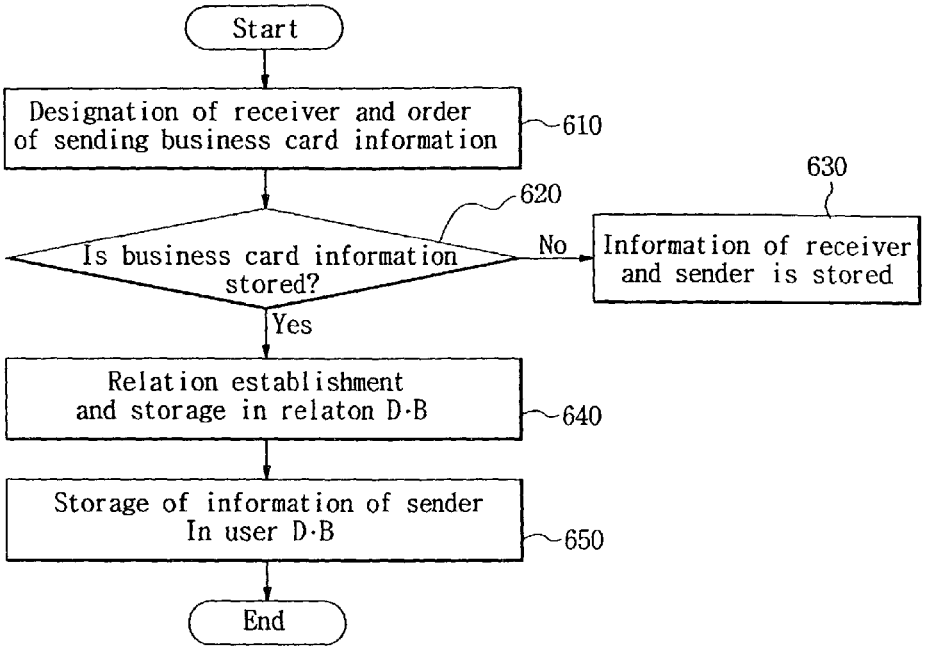
FIG. 6 is a flow cart showing procedure transferring business card information to a person who does not input his or her business card information.

It is possible for the present invention to transfer the business card information to a person who does not input his or her business card information and let the person to read the transferred business card information when he or she inputs his or her business card information. FIG. 6 shows such a procedure.

Firstly, the user who stores his or her business card information designates a receiver and orders the send of the business card information. (Step 610) For instance, by inputting the mobile phone number, the receiver is designated.

Then, whether the designated receiver is a user who already stores his or her business card information is judged. (Step 620) For instance, the designated receiver is not the one who already stores his or her business card information if the inputted mobile phone number is not on the business card information database 121.

If the designated receiver is not the user who already stores his or her business card information, new storage is formed where the receiver designation information and the sender information is store. (step 630) Accordingly, the designated receiver who stores his or her business card information later will read the business card information transferred to ho or herself.

If the designated receiver is the user who already stores his or her business card information, the relation of the sender and the receiver between them is established and is stored on the relation database 122 (Step 640), then, the busineess card sender information is stored in the user database 123. Later, the receiver can identify the sender of the business card information and selectively choose from them to transfer information.

Figure 7:
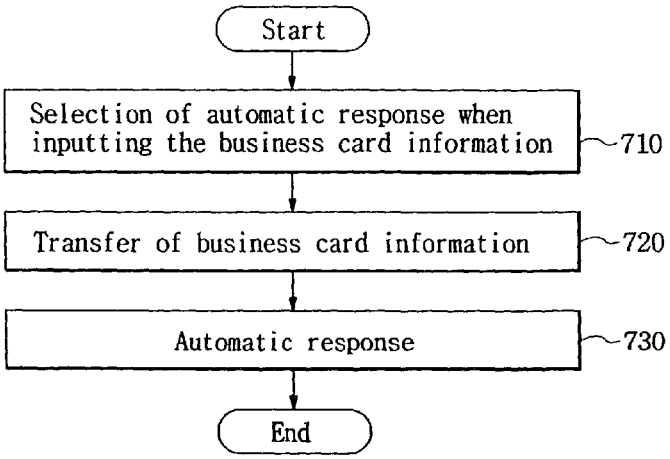
FIG. 7 is a view showing procedure of automatic response.

The information management system 10 of the present invention let the receiver of the business card information automatically respond to the sender to send back the receiver's business card information. This is shown with reference to FIG. 7.

Firstly, when a user access to the information management system 10 and inputs the user's business card information, the user chooses and inputs the automatic response. Then, to the user, automatic response is recorded on the business card information data base 121. (Step 710)

Then, the user who chose the automatic response is designated as a receiver and the business card information is transferred to the user. (Step 720)

Then, the information management system 10 extracts the business card information of the user of the receiver from the business card information database 121 and send back the information to the sender. (step 730)

Figure 12:
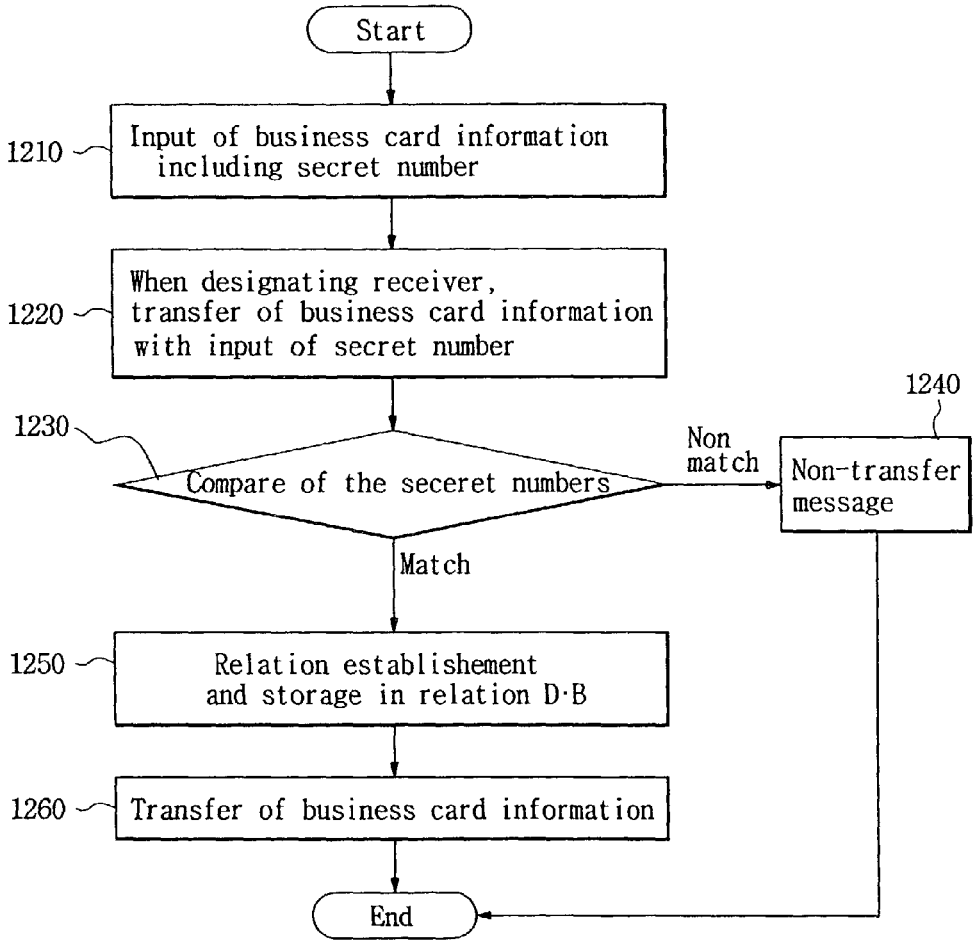
FIG. 12 is a view showing procedure of processing a selective receipt.

According to the present invention, a receiver can receive a business card information from one who knows the secret number of the receiver. Accordingly, selective information receipt is possible. FIG. 12 shows such a procedure.

Firstly, a user who inputs his or her business card information can inputs his or her secret number as a business card information (Step 1210) The secret number is one field value of the business card information database 121.

Then, when a sender transfers his or her business card information to the user who stores the secret number, the sender should inputs the secret number (Step 1220) Preferably, the information management system requests the secret number to the sender.

Then, the information management system 10 compares the secret number the sender inputs with the secret number stored (Step 1230)

If the two secret numbers are matched, the relation of the sender and the receiver is established to be stored in the relation database (step 1250), and the business card information is transferred. (step 1260)

If the two secret numbers are not matched, no transferring message is transferred to the sender. (step 1240)

Figure 13:
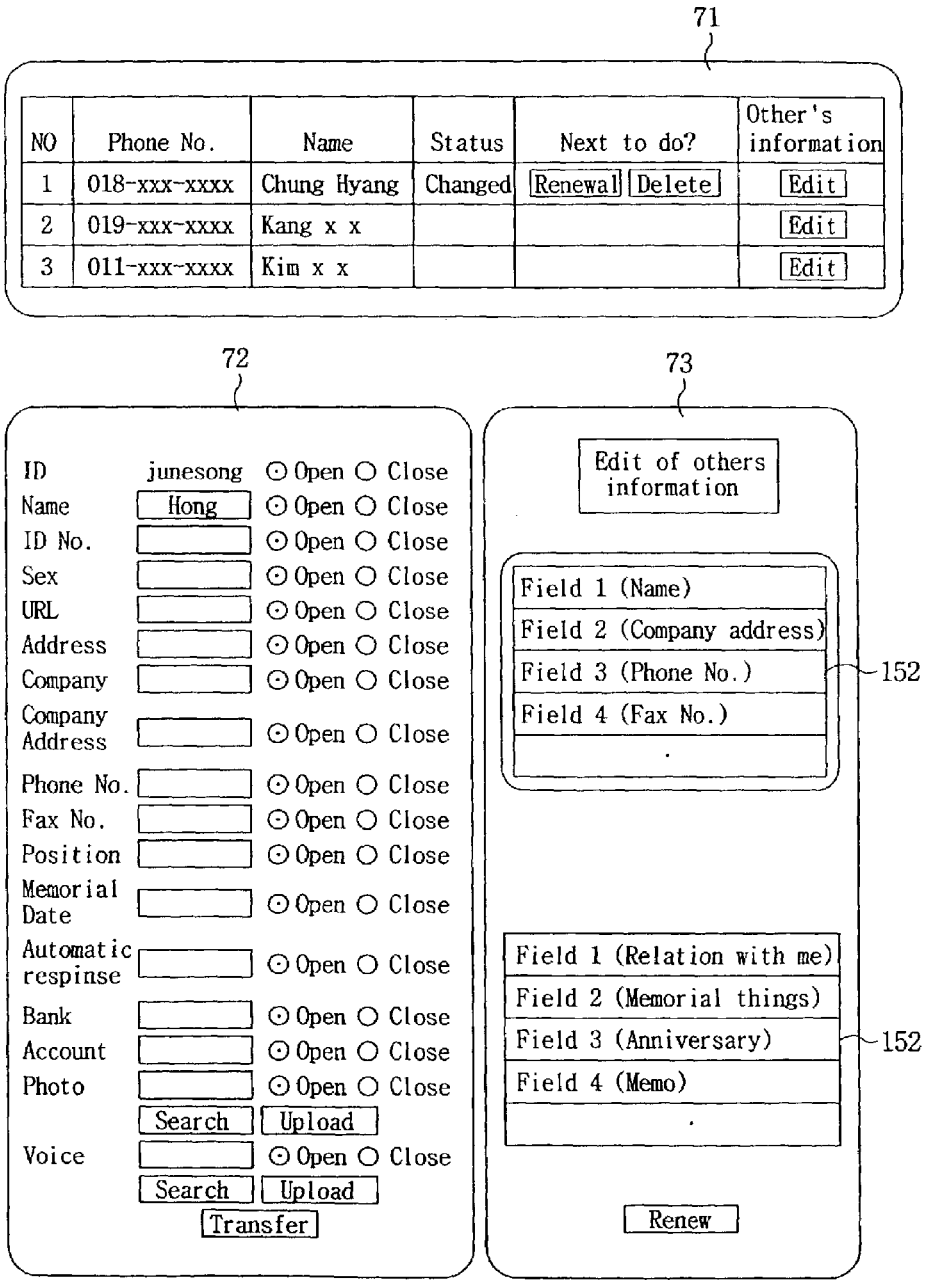
FIG. 13 is a view showing an interface screen of the mobile communication equipments or computers connected to the information management system of the present invention.

FIG. 13 shows interface according to the present invention. Firstly, referral number 71 indicates a view how the sender's business card information stored in the user database 123 is shown. Here, change signal and buttons of renewal/delete are shown, which are related to the description explained with reference to FIG. 11. When the sender's business card information is changed, the change signal is shown, by which the change is informed to the receiver. Pressing the renewal button makes the sender's business card information renewed and transferred to the receiver and pressing the delete button makes the break of the relation.

Also, signal of other's information edit is shown, which are related to the description of records in connection with a sender explained with reference to FIG. 9 When the edit button is pressed, the related record to the sender is shown as referral numeral 73 where items of menu are shown such as 132 or 152. In the items of menu such as 132 or 152 the related information to the sender is inputted (Step 920) and the inputted information is stored in the user database. (Step 940)

Further, reference numeral 72 shows the input window of the business card information when each of user sends his or her business card information.

Figure 8:
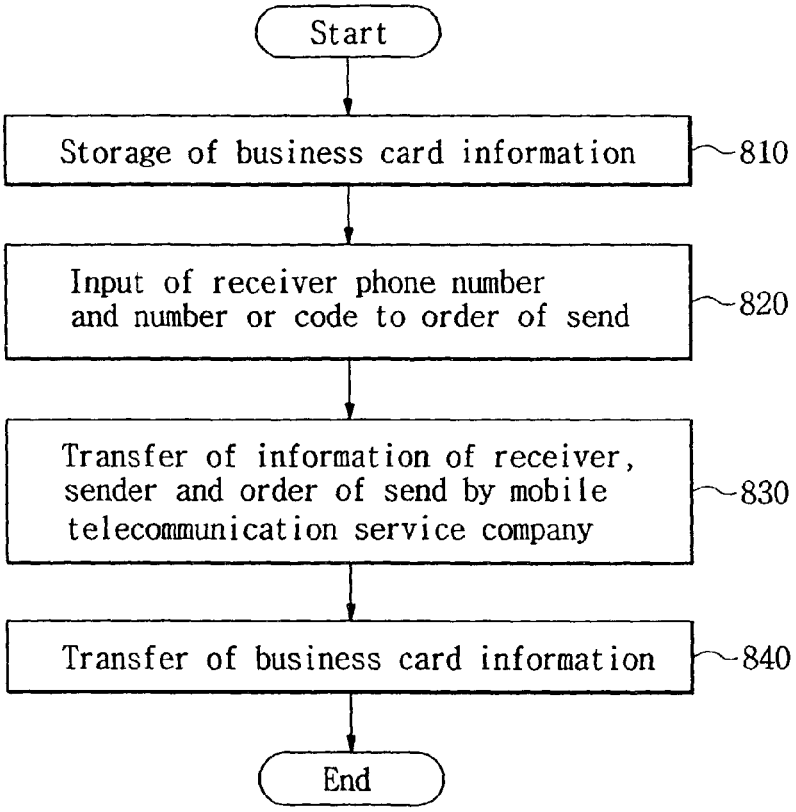
FIG. 8 is a view showing procedure transferring business card information not through the Internet.

When transferring the business card information according to the present invention, it is not always necessary for a user to order the send the information via the Internet. For instance, when the information is transferred by means of the mobile phone, it is possible to reach the information management system by inputting the mobile phone number without Internet interface such as wap interface. Such a procedure is shown in FIG. 8.

Firstly, the business card information of a user is stored in the business card information database 121. (Step 810)

Then, the user designates a receiver by inputting a receiver's phone number to the mobile phone and orders the send of the business card information. (Step 820) For instance, if the receiver's mobile phone number is 017-xxx-xxxx, this number is inputted so that the receiver is designated and press a button (for example # button) indicating the send order of the business card information.

Then, a mobile telecommunication service company, the mobile telecommunication network of which is used by the mobile phone, receive the order information and transfers it to the information management system 10. (Step 830) Since mobile telecommunication service company can identify a sender, phone number of a receiver and send order, it can transfer the above information to the information management system 10. For instance, the above information are made to database, and transferred to the information management system 10 via the dedicated line.

Then, the information management system 10 received the information of the sender, receiver and send order extracts the sender's business card information from the business card information database 121 and transfers to the designated receiver. (Step 840)

When orders the send of business card information by means of mobile phone number as described above, it is obvious that the mobile phone need not to include the Internet browser.

Specially, if the information management system 10 only does the transfer of the business card information, the relation database 122 and the user database 123 are not essential elements thereof. However, in this case, as explained with reference to FIG. 8, without the Internet interface, it is possible to transfer the business card information in such a way that a user inputs a receiver's mobile phone number to designate the receiver and puts some button to order the send. That is, by means of the mobile communication equipments 41a, 41b, . . . , 41n or computers 31a, . . . , 31n which include the Internet browser, the business card information is inputted and stored in the business card information database 121, and by following the procedure of FIG. 8, the business card information can be transferred. In this case, the business card information may be divided by its category and the information belonging to selected category be transferred. That is, the business card information are specified into its categories and are stored in the business card information database 121 by the category and when transferring the business card information by means of the mobile phone, it is possible to select specific information from the categories.

For instance, a user may input 017-xxxx-xxxx (receiver's phone number) 3 (the specific information the user want to transfer)#(send order) into the mobile phone. These inputted information are transferred to a mobile telecommunication service company and the company transfers the information to the information management system 10 so that the transfer of the business card information is accomplished. In this case, the sender may input the secret number the receiver designated, which means the receiver receives the business card information from the sender who knows the secret number. As a result, the selective receipt of the business card information is possible.

At this time, the information management system further includes a information transferring means by which it can transfer information in addition to the business card information. For instance, the web server may include SMS connection means so that a user can send short message as well as the business card information. In the above embodiments, the mobile communication equipments 41a, 41b, . . . , 41n are connected to the Internet via mobile telecommunication network 50 and the wap gateway 55. However, that is an example of how the mobile communication equipments are connected to the Internet and it is obvious that all means to connect the mobile communication equipment with the Internet are available.

INDUSTRIAL APPLICABILITY

As described above, according to the present invention, it is possible for user to distribute the user's business card information to multiple by one input of the business card information. And a receiver can send information including the receiver's business card information to the selected original senders at once.

According to the present invention, automatic business card management is possible. When the business card information change, a user can access to the information management system of the present invention and renew the information, and can send the renewed information to the former receiver. In this case, in the position of the individual receiver, that means that the business card information provided to him or her are automatically renewed and that automatic business card management by the business card provider is accomplished.

The present invention is described with reference to the specific embodiments, but the invention is not limited there to. Only the following claims will determine the scope of the invention.

What is claimed is

1. An information management system comprising:

(a) a web server connected to [user's] *users'* client computers;

(b) a database server connected to the web server including:

(b1) a business card information database storing business card information of each user;

(b2) a relation database in which the relation of a sender and a receiver is stored when one user orders the web server to send his or her business card information to another user, the user being the sender and the another user being the receiver;

(b3) a user database in which the senders associated with the respective receiver are stored, the senders being recognized from the relation database, and facts related to the sender which the receiver wants to record are stored on each of the sender's record in respect of the respective receiver;

(c) means for transferring the business card information of the sender to the receiver;

(d) means for reversely transferring the business card information of the receiver to the sender whom the receiver selects after the receiver's receipt of the sender's business card information; and (e) means for recording the facts related to the sender the receiver wants to record, which the receiver inputs, on each of the sender's record associated with the respective receiver in the user database and displaying the recorded facts to the receiver when the receiver requests.

2. The information management system as set forth in claim 1, wherein the database server further comprises a non user receiver database storing a receiver information and a record of a sender's sending of the business card information if the receiver is not one who has stored his or her business card information on the business card information database.

3. The information management system as set forth in claim 2, further comprising information transferring means to transfer information other than the business card information.

4. The information management system as set forth in claim 1, further comprising information transferring means to transfer information other than the business card information.

5. The information management system as set forth in claim 4 or 3, wherein the means for transferring information other than business card information is an E-mail server.

6. The information management system as set forth in claim 4 or 3, wherein the means for transferring information other than business card information is Short Message Service connection means connected to means for transferring short message to users.

7. In a server connected to [user's] *users'* client computers such as mobile communication [equipments] *equipment* or computers through the Internet, an information managing method comprising the steps of:

(a) a business card information storage step wherein business card information of each user is stored in the server;

(b) a relation of a sender and a receiver storage step wherein relation of a sender and a receiver is stored in the server when one user orders the server to send his or her business card information to another user, the user being the sender and the another user being the receiver;

(c) a sender associated with a receiver storage step wherein the senders associated with the respective receiver are stored in the server, the senders being recognized from the relation of the sender and the receiver stored in the server;

(d) a business card information transfer step wherein the server transfers the business card information of the sender to the receiver;

(e) a reversed business card information transfer step wherein the server reversely transfers the business card information of the receiver to the sender whom the receiver selects after the receiver's receipt of the sender's business card information; and (f) a facts related to the sender management step wherein facts related to the sender the receiver wants to record, which the receiver inputs, are recorded on each of the sender's record associated with the respective receiver, the sender's record associated with the respective receiver being formed in the sender associated with receiver storage step, and the recorded facts are displayed on the receiver's client computer when the receiver requests.

8. The information managing method as set forth in claim 7, wherein the business card information transfer step is that the server displays the business card information of the sender on the receiver's client computer.

9. The information managing method as set forth in claim 8 wherein, in the reversed business card information transfer step, the receiver selects from the displayed senders on the receiver's client computer.

10. The information managing method as set forth in claim 7, wherein it further comprises a group formation and storage step where when the sender's business card information is transferred to the receiver by the business card information transfer step, the senders are grouped and stored according to the groups and the reversed receiver selection step includes selectively designating the reversed receiver from the groups.

11. The information managing method as set forth in claim 7, wherein the business card information storage step includes a step of a selection of an automatic response so that when the business card information is sent to the receiver by the business card information transfer step, the sender automatically becomes the reversed receiver and the receiver's business card information is transferred to the original sender of the reversed receiver if the receiver selected automatic response.

12. The information managing method as set forth in claim 7, further comprising the steps of:

(a) a business card information change judgment step where the server compares the business card information storing date in the business card information storage step and the relation establishment date in relation establishment step to each other and judges that the business card information of the sender is changed if the business card information storing date is later than the relation establishment date; and (b) a renewal of the relation establishment date step where the server transfers the changed business card information of the sender to the receiver's client computer and renews the relation establishment date if it is judged that the business card information of the sender is changed.

*13. In a server connected to users' client computers such as mobile communication equipment or computers through the Internet, an information managing method comprising the steps of:*

*(a) an information storage step wherein business card information of each user is stored in the server;*

*(b) a relation of a sender and a receiver storage step wherein relation of a sender and a receiver is stored in the server when one user orders the server to send his or her information to another user, the said one user being the sender and the another user being the receiver;*

*(c) a sender associated with a receiver identification step wherein the senders associated with the respective receiver are identified from the relation of the sender and the receiver formed in the relation of a sender and a receiver storage step;*

*(d) an information transfer step wherein the server transfers the business card information of the sender to the receiver;*

*(e) a reversed information transfer step wherein the server reversely transfers the business card information of the receiver to the sender whom the receiver selects after the receiver's receipt of the sender's business card information; and*

*(f) a facts related to the sender management step wherein facts related to the sender the receiver wants to record, which the receiver inputs, are recorded in connection with the sender in respect of the receiver identified from the sender associated with a receiver identification step and the recorded facts are displayed on the receiver's client computer when the receiver requests.*

*14. The information managing method as claimed in claim 13 wherein the business card information includes useful information which should be informed of users.*

*15. In a server connected to users' client computers such as mobile communication equipment or computers through the Internet, an information managing method comprising the steps of:*

*(a) an information storage step wherein information of each user is stored in the server, the information of each user including information which should be informed of the users;*

*(b) a relation of a sender and a receiver storage step wherein relation of a sender and a receiver is stored in the server when one user orders the server to send his or her information to another user, the said one user being the sender and the another user being the receiver;*

*(c) a sender associated with a receiver identification step wherein the senders associated with the respective receiver are identified from the relation of the sender and the receiver formed in the relation of a sender and a receiver storage step;*

*(d) an information transfer step wherein the server transfers the information of the sender to the receiver;*

*(e) a reversed information transfer step wherein the server reversely transfers the information of the receiver to the sender whom the receiver selects after the receiver's receipt of the sender's information; and*

*(f) a facts related to the sender management step wherein facts related to the sender the receiver wants to record, which the receiver inputs, are recorded in connection with the sender in respect of the receiver identified from the sender associated with a receiver identification step and the recorded facts are displayed on the receiver's client computer when the receiver requests.*

*16. The method of claim 15 further comprising:*

*asking said another user whether to break the relation with said one user.*

* * * * *